June 9, 1925. 1,540,884
C. C. HERMANN ET AL
FEEDING MECHANISM FOR SPREADERS
Filed March 13, 1922 4 Sheets-Sheet 1
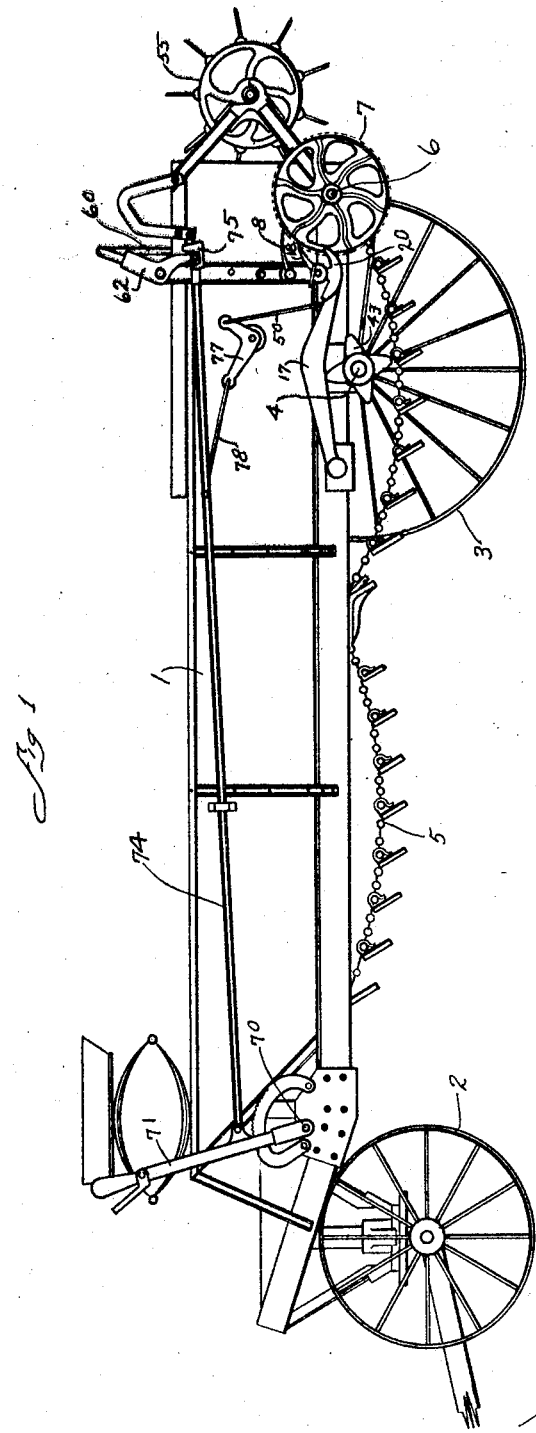
INVENTORS:
C. C. Hermann,
E. C. Litchfield &
BY H. L. Litchfield
ATTORNEY June 9, 1925.
C. C. HERMANN ET AL
1,540,884
FEEDING MECHANISM FOR SPREADERS
Filed March 13, 1922      4 Sheets-Sheet 2
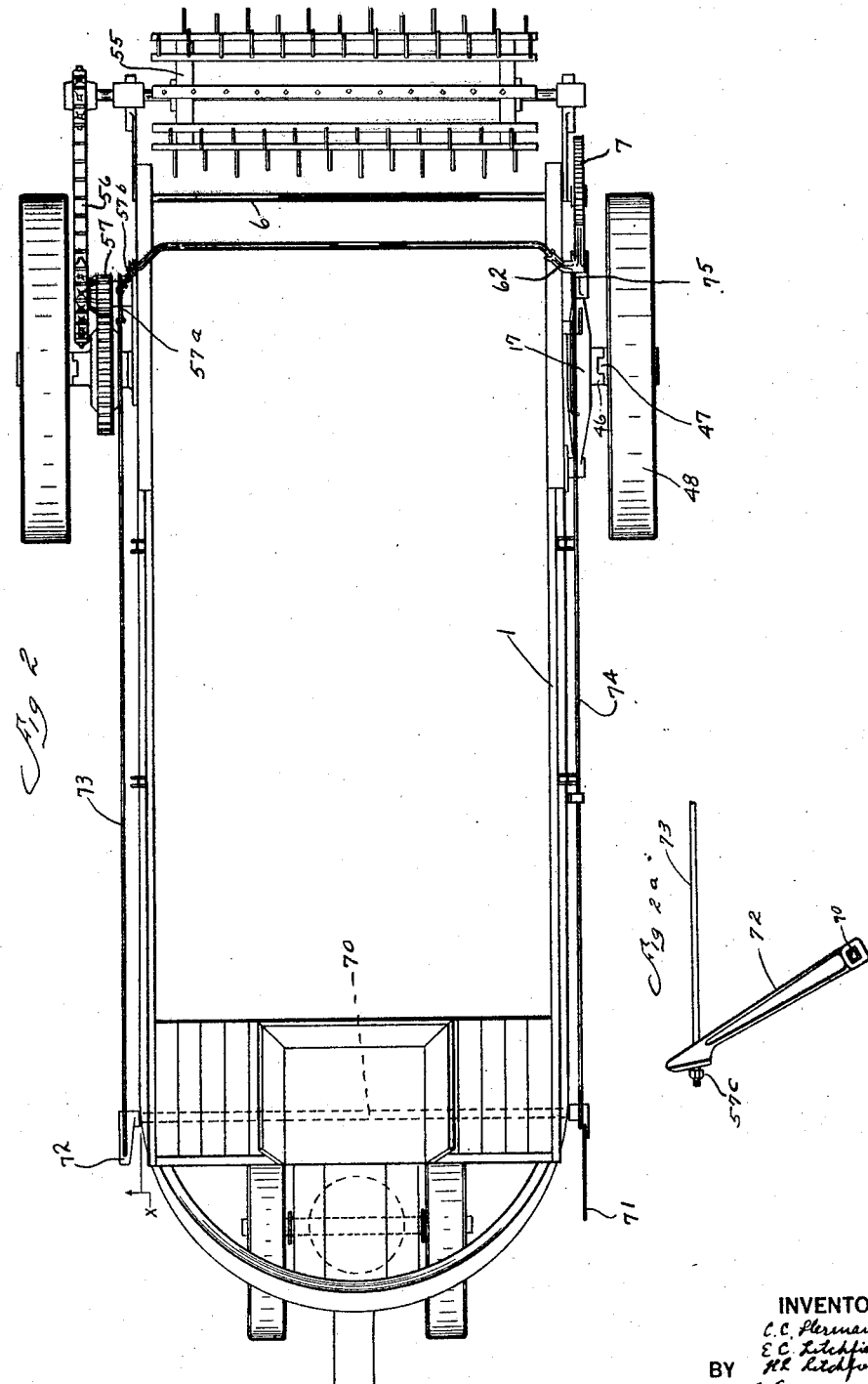

June 9, 1925.
C. C. HERMANN ET AL
1,540,884
FEEDING MECHANISM FOR SPREADERS
Filed March 13, 1922     4 Sheets-Sheet 3
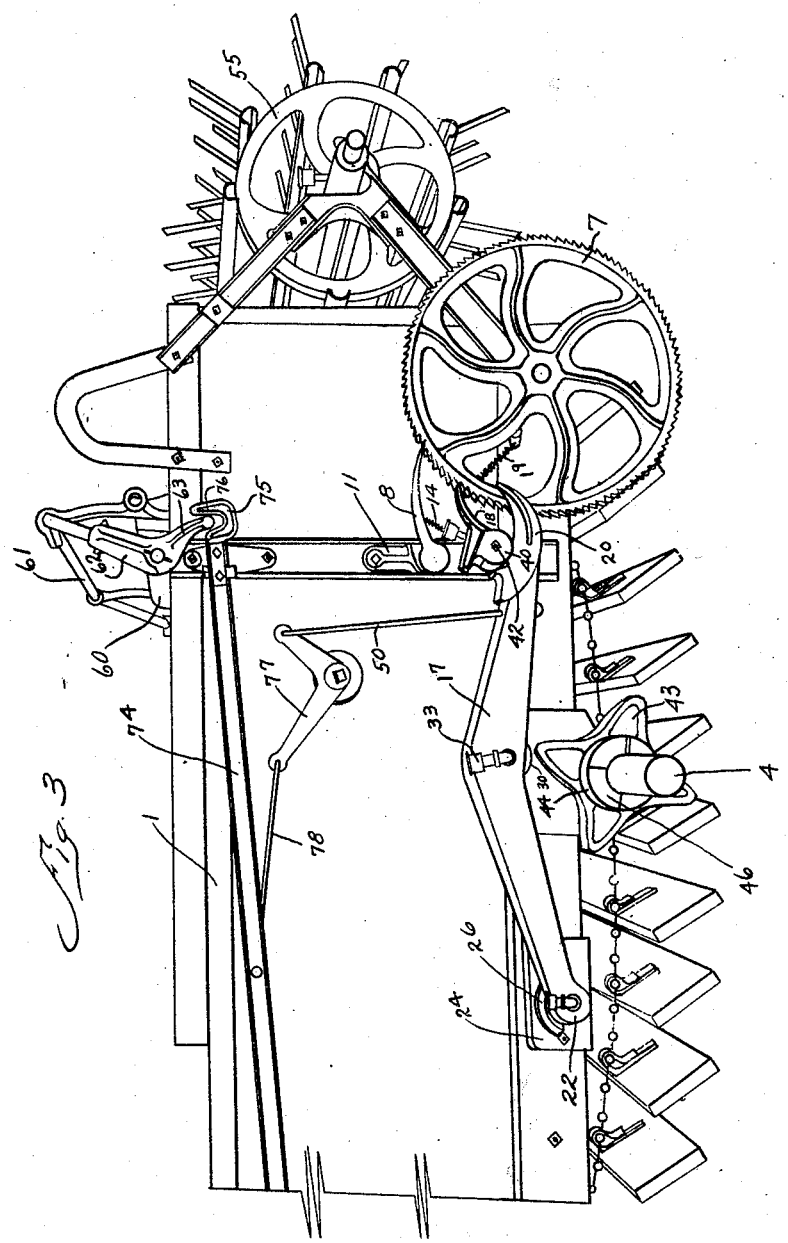
INVENTORS:
C. C. Hermann
C. C. Litchfield
BY H. L. Litchfield
ATTORNEY

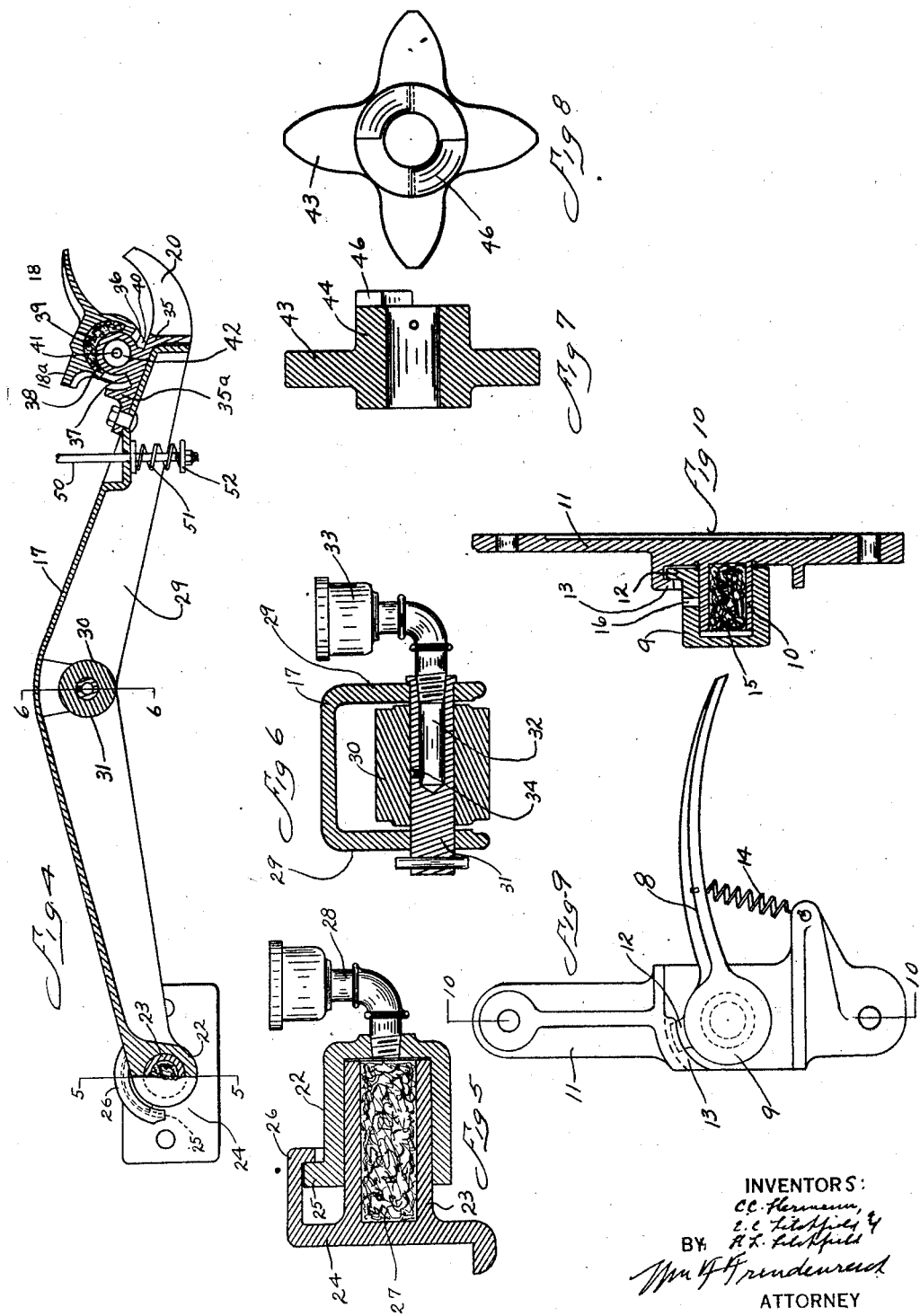

Patented June 9, 1925.

1,540,884

UNITED STATES PATENT OFFICE.

CLARENCE C. HERMANN, EDGAR C. LITCHFIELD AND HENRY L. LITCHFIELD, OF WATERLOO, IOWA; SAID HERMANN ASSIGNOR TO SAID EDGAR C. LITCHFIELD AND HENRY L. LITCHFIELD.

FEEDING MECHANISM FOR SPREADERS.

Application filed March 13, 1922. Serial No. 543,332.

*To all whom it may concern:*

Be it known that we, CLARENCE C. HERMANN, EDGAR C. LITCHFIELD, and HENRY L. LITCHFIELD, citizens of the United States, residing at Waterloo, county of Blackhawk, State of Iowa, have invented a certain new and useful Improvement in Feeding Mechanism for Spreaders, and declare the following to be a full, clear, and exact description of the same, such as will enable others skilled in the art to which it pertains to make and use the same, reference being had to the accompanying drawings, which form a part of this specification.

The present invention has for its primary object to simplify and improve the actuating means for the distributing mechanism of fertilizer spreaders, make them stronger and more durable, and insure efficient operation even after the parts have become much worn.

In carrying out the present invention, use is made of a novel form of lever for actuating the ratchet wheel associated with the conveyor which carries the material toward the rear in the spreader body, the lever being positively driven in one direction by a cam rotatable with the main rear axle of the vehicle or with one of the rear spreader wheels to a predetermined angular position and dropping back by gravity through a return stroke varied at will by the driver according to rate at which the fertilizer is to be discharged.

In one of its aspects, therefore, the present invention may be regarded as having for its object to produce a simple, powerful and durable ratchet drive controlled in a simple manner to vary the driving speed.

In some spreaders it is usual to provide a tail gate which is lifted out of the way of the material carried rearwardly in the spreader body to the distributing point. One of the objects of the present invention is to produce a simple and novel master controller for the tail gate at the rear end of the spreader, and the actuating mechanisms, at opposite sides of the spreader, for the beater wheel and the conveyor, respectively.

A further object of the present invention is to produce a simple and novel bearing construction which will permit swinging arms, levers or pawls on a spreader or the like to be mounted quickly, without the necessity of fastening or unfastening nuts, bolts, screws and the like, and without danger of accidental dismounting of the parts in service.

A further object of the present invention is to produce a simple and novel bearing construction in which the bearing will be shielded against the entrance of dirt and other foreign matter which it has heretofore been so difficult to keep out of bearings in use in spreaders.

The various features of novelty whereby the present invention is characterized will hereinafter be pointed out with particularity in the claims; but, for a full understanding of the present invention and of its objects and advantages, reference may be had to the following detailed description taken in connection with the accompanying drawings, wherein:

Figure 1 is a side elevation of a spreader embodying the features of the present invention in a preferred form;

Fig. 2 is a top plan view of the spreader;

Fig. 2ª is a section on line X of Fig. 2, illustrating a detail;

Fig. 3 is an enlarged perspective view of the rear end of one side of the spreader;

Fig. 4 is a longitudinal vertical section on a larger scale through the pawl-lever for actuating the conveyor;

Fig. 5 is a section, on a still larger scale, on line 5—5 of Fig. 4;

Fig. 6 is a section, on the same scale as Fig. 5, on line 6—6 of Fig. 4;

Fig. 7 is an axial section through the driving cam;

Fig. 8 is an end view of the cam;

Fig. 9 is an elevation, on an enlarged scale, of the holding pawl for the main ratchet wheel, together with the supporting bracket for said pawl; and Fig. 10 is a section on line 10—10 of Fig. 9.

Referring to the drawings, 1 represents any usual or suitable spreader body mounted on front wheels 2 and rear wheels 3, the latter being preferably supported on an axle 4. The bottom of the spreader body is formed of any usual or suitable conveyor 5 passing around a transverse driving shaft 6 at the rear end of the body. On one end of the shaft 6, on the outer side of one of the side walls of the spreader body, is fixed a ratchet wheel 7.

Co-operating with the ratchet wheel is a holding pawl 8 which prevents the ratchet wheel from turning backwards. The details of the holding pawl are best shown in Figs. 9 and 10. At the base of the pawl is a cup-shaped hub 9 fitting over a journal 10 projecting from a bracket 11 which is adapted to be secured to the side of the spreader body in any suitable way. The hub 9 has at the inner end a radially-projecting flange 12, while the bracket has integral therewith an arc-shaped flange 13 which extends across the outer edge of the flange 12 and then downwardly so as to overlap the outer face or side of the flange 12. The flanges 12 and 13 may be of any desired angular lengths as long as their combined lengths do not exceed three hundred and sixty degrees; whereby the pawl may always be placed in position or removed when it occupies a predetermined angular position with respect to the journal 10 and will be locked against removal while in other predetermined angular positions. In the arrangement shown, the flange 12 is quite short and the flange 13 also is no longer than is required to take care of the comparatively small oscillation which the pawl must make. The pawl 8 is held against the ratchet wheel by a spring 14. The journal 10 is provided with a large chamber 15 open at the outer end of the journal and adapted to contain lubricating material. The closed end of the cup-shaped hub of the pawl closes the open end of the lubricant reservoir or chamber. The lubricating material in the bearing may be replenished with oil from time to time by introducing the oil through a suitable oil hole 16 in the hub.

In front of the ratchet wheel lies an approximately horizontal lever 17 pivotally supported at its front end and having at its rear end a pawl 18 engaged with the teeth of the ratchet wheel and held in operative relation thereto by means of a spring 19 one end of which may be attached to the pawl and the other end to a portion of the spreader body. The free end of the actuating lever is provided with a fork 20 above and between the prongs of which the actuating pawl is located. The prongs of the fork therefore engage with the sides of the ratchet wheel while the actuating pawl engages with the teeth, the fork serving as a guide to hold the pawl in the plane of the wheel and prevent accidental displacement thereof. The details of the actuating lever and pawl are best shown in Figs. 4, 5 and 6. Referring to these figures, it will be seen that the actuating lever is provided at its front end with a cup-shaped hub 22 fitting over a chambered trunnion 23 which projects outwardly from the face of a bracket 24. The hub and the bracket are provided respectively with flanges 25 and 26 similar to the flanges 12 and 13 on the holding pawl 8 and its supporting bracket. The flange 26 preferably extends across the upper half of the journal so that dirt or refuse dropping down upon the same will not have an opportunity of entering between the bearing surfaces. As in the case of the flanges 12 and 13, the flanges 25 and 26 should have a combined angular length not exceeding three hundred and sixty degrees, in order that the hub and the journal may be assembled by simply bringing them together in the axial direction, when the lever occupies a predetermined angular position with respect to the journal, and will be held interlocked during the ordinary working movements of the lever. The chamber within the journal may be filled with an oiled waste 27 or other suitable lubricant-retaining material. If desired, the hub may be provided with an oil cup 28 which may be filled from time to time, and from which oil may flow both between the bearing surfaces and also into the chamber or reservoir in the journal. For the sake of lightness and strength, it is preferred to give the actuating lever a channel-shaped cross section, the flanges 29 of the channel being directed downwardly. About midway between the ends of the actuating lever is placed a roller 30, the same being housed between the flanges and revoluble upon an axle or shaft 31 extending transversely through said flanges. The member 31 is preferably fixed to the flanges in any suitable way as, for example, by making it a driving fit, so as to prevent rotation thereof. The member 31 is chambered at one end as indicated at 32, an oil cup 33 being connected to the chamber. A port 34 opens out through the surface of the shaft or axle 31 from the inner end of the chamber, so as to permit lubricant to flow from the chamber to the bearing surfaces.

The guiding fork 20 forms part of a suitable bracket 35 which is made separate from the actuating lever and fastened thereto in any suitable way. On top of the bracket, between and at the inner ends of the prongs of the fork, is a transverse journal 36 which does not form a complete cylinder because of the connecting web 37 which unites it to the body of the bracket. The pawl 18 is provided with a substantially semi-circular bearing 38 adapted to rest on the journal and be placed in position or removed laterally or in the radial direction. The greater portion of the face of the bearing 38 is preferably cut away to form a chamber 39 in which a lubricating material may be packed.

The pawl is provided with flanges or wings 40 at the ends of the bearing seat, these flanges or wings being adapted to lie against the ends of the journal. The pawl is held in place by means of a suitable bolt 41 passing through the flanges or wings and through the journal. The purpose of the bolt is simply to hold the pawl in place and not take the thrust that comes upon the pawl during its working stroke in turning the ratchet wheel. Therefore the hole 42 in the journal, through which the bolt passes, is preferably made considerably larger than the diameter of the bolt. In front of the web 37 is a curved wall or ledge 35ª over which hangs a flange or lip 18ª on the pawl, the wall and the flange or lip serving as a guard to prevent dirt travelling rearwardly along the top of the actuating lever and falling down from above from entering the bearing for the pawl.

The actuating lever is adapted to be swung in the upward direction, namely in the direction to turn the ratchet wheel, by means of a suitable cam 43 fixed to the rear vehicle axle. In the arrangement shown, the cam has roughly the shape of a four-pointed star provided with a hub 44 which surrounds the rear axle 4 of the spreader and has at the outer end lugs 46 adapted to interlock with corresponding lugs 47 on the hub of one of the rear traction wheels 48, as best seen in Fig. 2. The parts are so proportioned that when the supporting bracket 24 for the actuating lever is fastened to the frame of the machine in such a position that the actuating pawl is in proper relation to the ratchet wheel, the roller 30 lies above the cam 43. Consequently, when the spreader is in motion and the cam is revolving, the cam will alternately lift the actuating lever and recede from the same so as to permit it to descend. It will be noted that the movement of the pawl is much greater than the movement of that point in the actuating lever which is engaged by the cam, a long stroke of the pawl being thus secured without the necessity of using a big heavy cam having a stroke equal to the maximum stroke of the pawl. The weight of the actuating lever and the parts carried thereby is sufficient to cause it to drop when left free to do so and therefore as soon as a high point on the cam passes from underneath the cam roller on the lever, the lever descends by gravity. In other words, the actuating or working stroke of the lever is effected positively while the return stroke takes place simply under the action of gravity. It will be seen that the cam always lifts the lever to the same point or position, so that the upward limit of the actual working stroke of the lever is always the same. It is not desirable, however, that the speed at which the conveyor is driven be invariable, and therefore means must be provided for varying the effective working stroke of the actuating lever. Since the actuating lever is always raised to a predetermined height by the cam, the effective length of the working stroke may be varied by varying the distance through which the lever may drop during the return stroke. In the arrangement shown, the free end of the actuating lever is hung from a controlling rod 50 the lower end of which extends loosely through the top wall or web of the actuating lever and is provided with a coiled spring 51 on which the lever rests; the spring in turn resting on a suitable shoulder 52 at the lower end of the rod. It will be seen that by raising and lowering the controlling rod, the stroke of the actuating lever may be varied between zero and a maximum; there being no movement of the lever during the rotation of the cam, if the lever be held in a position at least as high as that to which it may be raised by the cam, and the maximum stroke being obtained when the controlling rod is lowered far enough to permit the lever to drop down to the lowest level permitted by the cam. Therefore, by properly manipulating the controlling rod, it is possible to move the spreader about from place to place without affecting the conveyor and, when the fertilizer is to be distributed, the conveyor may be driven step by step at any desired speed by varying the effective length of the stroke of the actuating lever.

As the fertilizer is fed toward the rear by the conveyor, it is necessary to scatter the same upon the surface over which the spreader is traveling, suitable distributing means such as, for example, a beater wheel 55, being employed for this purpose. The driving mechanism heretofore described has all been shown as located on one side of the spreader. The driving mechanism 56, including a clutch and small gear 57, for the beater wheel, may conveniently be placed on the opposite side of the spreader. It is customary in spreaders of this kind to provide a suitable tail gate just in front of the beater wheel, this tail gate being lifted out of the way to permit the material to be carried to the beater wheel before the conveyor is set in operation. In the arrangement shown, there is a tail gate 60 hung from a bail-like element 61 one of whose arms 62 forms with an attached arm 63, a bell crank lever by means of which the tail gate is raised and lowered.

In accordance with the present invention, means are provided for controlling the tail gate, the beater wheel, and the conveyor, from a single point within convenient reach of the driver of the spreader. To this end there extends transversely across the front end of the spreader, preferably in front of the spreader box, a rock shaft 70 on one end of which is an operating handle or lever 71 while on the other end is a rock arm 72. An actuating rod 73 extends rearwardly from the rock arm 72 to the clutch 57 so that when the rock shaft is moved in one direction, the clutch is thrown in and when the rock shaft is moved in the other direction, the clutch is thrown out. This part of the construction, including the driving mechanism for the beater wheel, and the clutch, may conveniently take substantially the form disclosed in the Litchfield and Shiplet Patent 1,294,496 dated February 18, 1919. Instead, however, of fastening the actuating rod to the lever 72 so that it must always move with it, we extend this rod loosely through the lever and provide it with a head 57$^c$ which is engaged by the lever when the latter is moved forward far enough, thereby releasing the clutch. The rear end of the actuating rod 73 is fastened to the clutch lever 57$^a$ to which is fastened a spring 57$^b$ tending constantly to swing the clutch lever backward and throw the clutch in. To the lever 71 is attached an actuating rod 74 at the rear end of which is an upwardly-opening jaw 75 into which the free end of the arm 63 by which the tail gate is actuated, extends. The jaw may be said to take the form of a hook, the nose 76 of which projects upwardly above the opposite part or base. The arrangement is such that when the actuating rod 74 is moved back, the first operation is the swinging of the bell crank lever to raise the tail gate. When the arm 63 of the lever has been swung upwardly a predetermined distance, its free end leaves the jaw or hook, so that the rod can continue its rearward movement without interference on the part of the tail gate and parts connected with the latter; but, when the rod is drawn forward again, the elongated nose 76 engages with the arm 63 and causes the tail gate to be swung down again.

The upper end of the controlling rod 50 for the actuating lever 17 for the conveyor is fastened to one arm of a bell crank lever 77 the other arm of which is connected to the actuating rod 74 by means of a link 78. Therefore, as the actuating rod or bar 74 is moved back and forth, the controlling rod 50 is raised and lowered. The parts are so proportioned that the first movement of the handle or lever 51 in the vicinity of the driver's seat in the rearward direction results in the lifting of the tail gate and permitting the clutch to be thrown in so that the beater wheel is set in motion. After these two steps have been performed, the continued rearward movement of the hand lever produces a lowering of the lever 17 into driving relation to the ratchet wheel, the rod 73 on the right hand side of the machine remaining stationary during this latter operation. The farther the hand lever is pushed back, the lower the actuating lever may descend during each return stroke, and therefore the greater will be the number of teeth which will be passed by the actuating pawl during each return stroke and consequently the greater will be the angular distance through which the ratchet wheel will be driven through each power stroke. The rate at which the fertilizer is fed toward the rear is therefore under the control of the driver and may be nicely regulated by means of the single hand lever which serves also to lift the tail gate and throw in the beater wheel clutch.

One of the important results attained with the present invention is efficiency of operation long after an amount of wear sufficient to make it impracticable to operate an ordinary spreader has occurred. This is due to the fact that no delicate adjustment of the parts is required, that the comparatively small cam will always insure a sufficiently long stroke of the lever to operate the ratchet wheel through any desired length of step, and that the controller for the actuating lever can always position the latter so as to secure the desired rate of feed of the fertilizer.

While we have illustrated and described with particularity only a single preferred form of the present invention, we do not desire to be limited to the exact structural details thus illustrated and described; but intend to cover all forms and arrangements which come within the terms employed in the definitions of our invention constituting the appended claims.

We claim:

1. The combination with the movable conveyor in a wheeled spreader, of a vertical ratchet wheel for driving the same, a vertically-swinging lever pivoted at one end and having at the other end a pawl for actuating said ratchet wheel, a rotatable cam underlying said lever at a point between the ends of the lever, said cam being constructed and arranged positively to raise the lever and to permit it to be lowered by other means, a vertical rod extending loosely through said lever, a spring on the lower end of the rod forming a yieldable seat for said lever, and a controller for raising and lowering said rod.

2. In combination, a ratchet wheel, an arm pivoted at one end and having at the free end a guide fork embracing the marginal portion of the ratchet wheel, and a pawl pivotally mounted on the free end of the arm between the prongs of the fork and engaged with the periphery of the ratchet wheel.

3. In combination, a ratchet wheel, a pivoted lever having at its free end a guide fork engaged with said wheel, and a pawl pivotally mounted on the lever and engaging said wheel.

4. A pawl device comprising an arm pivoted at one end, a fork at the free end, a roller carried on the arm between the ends thereof, and a pawl pivotally mounted on the free end of the arm between the prongs of the fork.

5. A pawl device comprising an arm pivoted at one end and having a cross-section in the shape of an inverted U, a roller mounted between the flanges of the arm at a point between the ends thereof, and a pawl movably mounted on the free end of the arm.

6. A pawl device comprising an arm pivoted at one end and having a cross-section in the shape of an inverted U, a roller mounted between the flanges of the arm at a point between the ends thereof, a fork at the free end of the arm, and a pawl movably mounted on the free end of the arm between the prongs of the fork.

7. A pawl device comprising an arm pivoted at one end, a bracket secured to the free end of said arm, said bracket having a fork forming an extension of said arm and a journal at the inner end of the fork, and a pawl mounted on said journal and lying between the prongs of the fork.

8. A pawl device comprising an arm pivoted at one end, a bracket secured to the other end having a fork forming a continuation of the arm and a journal at the inner end and above said fork, a pawl having a downwardly-facing seat resting on said journal and flanges extending downwardly past the ends of said journal, and a bolt passing through said flanges and said journal.

9. A pawl device comprising an arm pivoted at one end, a bracket secured to the other end having a fork forming a continuation of the arm and a journal at the inner end and above said fork, a pawl having a downwardly-facing seat resting on said journal and flanges extending downwardly past the ends of said journal, and a bolt passing through said flanges and said journal, the bolt hole in the journal being larger in diameter than the bolt so as to permit the thrust of the pawl to be borne by the journal.

10. A pawl device comprising an arm, a journal at one end of said arm, a pawl having a semi-cylindrical seat engaged with said journal and flanges extending past the ends of said journal, and a bolt passing through said flanges and through said journal.

11. A pawl device comprising an arm, a journal at one end of said arm, a pawl having a semi-cylindrical seat engaged with said journal and flanges extending past the ends of said journal, said seat being recessed between the margins thereof to form a chamber for a lubricating material, and a bolt passing through said flanges and through said journal.

12. A pawl device comprising a member having a journal, a pawl having a seat resting on said journal and flanges projecting past the ends of the journal, and fastening means between the said flanges and the journal constructed and arranged to hold the pawl on the journal and at the same time permit the thrust of the pawl to be borne directly by the journal.

13. A pawl device comprising a member having a fork projecting therefrom and a journal above and at the inner end of the fork, and a pawl lying between the prongs of the fork and having a seat engaged with said journal, and flanges on said pawl extending past the ends of said journal.

14. A pawl device comprising a member having a web extending across the top of the same, the upper edge of the web being rounded to form a journal, a pawl having a bearing seat resting on said journal, a wall rising from said member near and parallel to said journal, and a flange on said pawl extending over the top of said wall.

15. A pawl device comprising a member having a fork projecting therefrom and a journal above and at the inner end of the fork, a pawl lying between the prongs of the fork and having a seat engaged with said journal, flanges on said pawl extending past the ends of said journal, and fastening means between said flanges and said journal arranged to permit the thrust of the pawl to be borne directly by the journal.

16. In combination with a wheeled vehicle, an element adapted to be driven step by step, a vertical ratchet wheel for driving said element, a vertically-swinging lever pivoted at one end and having at its free end a guide fork engaged with said wheel, a pawl pivoted on said lever at the base of said fork and engaged with said ratchet wheel for driving the same, a cam fixed to one of the vehicle axles and underlying said lever between the ends thereof and remote from the free end for alternately swinging the lever upwardly and permitting it to descend, and a controlling device for varying the distance through which said lever can descend from the position to which it is raised by the cam.

In testimony whereof, we sign this specification.

CLARENCE C. HERMANN.
EDGAR C. LITCHFIELD.
HENRY L. LITCHFIELD.